United States Patent
Hendel et al.

(10) Patent No.: US 7,334,076 B2
(45) Date of Patent: Feb. 19, 2008

(54) METHOD AND SYSTEM FOR A GUEST PHYSICAL ADDRESS VIRTUALIZATION IN A VIRTUAL MACHINE ENVIRONMENT

(75) Inventors: Matthew D. Hendel, Seattle, WA (US); Eric Traut, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 348 days.

(21) Appl. No.: 11/075,219

(22) Filed: Mar. 8, 2005

(65) Prior Publication Data
US 2006/0206658 A1 Sep. 14, 2006

(51) Int. Cl.
*G06F 12/00* (2006.01)
(52) U.S. Cl. .......................... 711/6; 711/147
(58) Field of Classification Search ............... None
See application file for complete search history.

(56) References Cited
U.S. PATENT DOCUMENTS

| | | | |
|---|---|---|---|
| 4,742,450 A | 5/1988 | Duvall et al. ............... 364/200 |
| 6,075,938 A | 6/2000 | Bugnion et al. ........ 395/500.48 |
| 6,738,977 B1* | 5/2004 | Berry et al. ................. 719/332 |
| 6,785,763 B2* | 8/2004 | Garnett et al. ................. 711/6 |
| 6,789,156 B1 | 9/2004 | Waldspurger .................. 711/6 |
| 2004/0083481 A1* | 4/2004 | Shultz et al. ............... 719/312 |
| 2004/0210764 A1* | 10/2004 | McGrath et al. ............ 713/200 |

* cited by examiner

*Primary Examiner*—Reginald Bragdon
*Assistant Examiner*—Thanh D. Vo
(74) *Attorney, Agent, or Firm*—Woodcock Washburn LLP

(57) ABSTRACT

A method of sharing pages between virtual machines in a multiple virtual machine environment includes initially allocating a temporary guest physical address range of a first virtual machine for sharing pages with a second virtual machine. The temporary range is within a guest physical address space of the first virtual machine. An access request, such as with a DMA request, from a second virtual machine for pages available to the first virtual machine is received. A reference count of pending accesses to the pages is incremented to indicate a pending access and the ages are mapped into the temporary guest physical address range. The pages are accessed and the reference count is decremented. The mapping in the temporary guest physical address range is then removed if the reference count is zero.

11 Claims, 6 Drawing Sheets

GPA to SPA Mapping

GVA to SPA Mapping

GPA to GVA Mapping

METHOD AND SYSTEM FOR A GUEST PHYSICAL ADDRESS VIRTUALIZATION IN A VIRTUAL MACHINE ENVIRONMENT

FIELD OF THE INVENTION

The invention relates to the field of computer programming. More specifically, the invention relates to accessing host resources available to a first virtual machine by a second virtual machine in a virtual machine environment.

BACKGROUND OF THE INVENTION

Virtual computing allows multiple virtual machines, each having their own operating system, to run on a host computer. The host computer has a virtualizer program that allows the host computer to execute the instructions of a virtual machine program, which may have a different CPU model than the host computer. The host computer virtualizer program can also virtualize the hardware resources of the host machine for virtual machine use. The virtual machine that is requesting hardware resources such as CPU, memory, I/O and disk space is called a guest with respect to the host computer.

In a virtual machine, the guest computer system only exists in the host computer system as a pure software representation of the operation of one specific hardware architecture. The terms virtualizer, emulator, virtual machine, and processor emulation are sometimes used interchangeably to denote the ability to mimic or emulate the hardware architecture of an entire computer system using one or several approaches known and appreciated by those of skill in the art. A virtualizer program executing on the operating system software and hardware architecture of the host computer mimics the operation of the entire guest computer system.

The virtualizer program acts as the interchange between the hardware architecture of the host machine and the instructions transmitted by the software (e.g., operating systems, applications, etc.) running within the emulated guest virtual machine environment. In one virtual machine environment embodiment, the emulated environment may include a virtual machine monitor (VMM) which is a software layer that runs directly above the host hardware, perhaps running side-by-side and working in conjunction with the host operating system, and which can virtualize all the resources of the host machine (as well as certain virtual resources) by exposing interfaces that are the same as the hardware the VMM is virtualizing. This virtualization enables the virtualizer (as well as the host computer system itself) to go unnoticed by operating system layers running above it. In a virtual machine environment, the multiple virtual machines impose performance requirements on the hardware resources of the host machine. It is desirable to keep one virtual machine separated from the other virtual machines as well as separated from the host. Separation or isolation of one virtual machine from another is useful to isolate errors and faults such that one virtual machine fault does not affect another virtual machine.

Yet, in some configurations, it is desirable to have one virtual machine access host resources available to a second virtual machine. FIG. 1 depicts a virtual computer system 100. The system 100 includes a first virtual machine 110, a second virtual machine 115, and virtualization software 120 residing in a host computer system 105. The virtualization software assists in maintaining a controlled isolation between virtual machines by, for example, separating the virtual machine addresses from the host system addresses. The first virtual machine 110 is a software program that includes virtual machine applications 125 running on an operating system 130 having a driver 150 to access a database 145. The second virtual machine 115 is a software program that includes virtual machine applications 135 running on an operating system 140 having a virtual driver 155. The host computer system 105 has host resources such as input output channels, memory, processors, and software which may be allocated to any of the virtual machines 110, 115. In the specific example of FIG. 1, the host resource is an I/O channel 165 accessing a database 145. The configuration of FIG. 1 indicates that the second virtual machine 115 can access the database 145 by using virtual driver 155 through the virtualization software 120 to communicate with driver 150 connected to I/O path 165 to database 145.

In a virtual machine environment, the guest is allocated host system resources such as memory. An application of a guest virtual machine generates a virtual address to access memory for the guest's purpose. This virtual address is translated to a physical address related to the guest. However, each virtual machine in the virtual machine environment maintains a separate notion of a physical address space. From the perspective of a virtual machine, its physical address spaces may appear to start at physical address zero or any other page-aligned physical address and may span as large a region as is supported by the virtualization software, which keeps note of memory allocations in the various virtual machines of a host system. Shadow page tables are typically used as part of virtualization software to provide each virtual machine with a separate physical address space.

A guest physical address space or GPA space refers to a virtual machine's physical address space. Accordingly, a guest physical address or GPA refers to addresses within the GPA space. The use of a guest physical address space supports the operations of insertion, removal and query for support of the guest virtual machine. A guest virtual address or GVA is a virtual address private to a specific virtual machine. Normally, guest virtual addresses (GVAs) are translated into guest physical addresses (GPAs). However GPAs cannot be used to access host physical memory. Accordingly, GPAs are translated into host or system physical addresses (SPAs). To reduce the overhead in address translation, the virtualizer program maintains shadow page tables that map GVAs to SPAs. The virtualizer also maintains internal data structures that store the GPA to SPA mapping. FIG. 2 shows an example mapping of guest physical pages to system physical pages. Note there may be multiple guest physical addresses that can map to a single guest physical address. For example, guest physical address space page frame number PFN 202 and PFN 203 map to system physical page number PFN 102.

Operation of a virtual machine and the management of the guest physical address space can present several interesting problems. For example, when a region of guest physical address space is removed, it is necessary to purge guest virtual addresses that map to regions within the removed section of guest physical address space. This purge results in the invalidation of any outstanding mappings to regions within the removed section of GPA. Thus, if a section of GPA is removed, any virtual addresses that were constructed using GPA within the region being removed will need to be invalidated. In an example architecture, there may be two locations where GVA-to-SPA mappings are maintained, hence there are two places where these GVA-to-SPA mappings must be removed. The two areas that maintain virtualto-physical mappings are within the shadow page tables and within the hardware translation look-aside buffer (TLB). Each of these caches must be purged to maintain the correctness of the virtualization and to prevent security breaches between virtual machines. FIG. 3 shows GVA-to-SPA mappings. Note that multiple guest virtual address may map to the same system physical address page. For example, guest virtual address VA C000:1000 and VA C000:2000 map to system physical page number PFN 102. Such a mapping is evident in a shadow page table useful to speed up the conversion of a guest virtual address to system address translation.

Unfortunately, since the shadow page table data structures maintain a mapping from GVA to SPA, it is not possible to query all GVAs that map to a specific GPA by querying the shadow page table shown in FIG. 3. However, a mapping of GPAs to SPAs as shown in FIG. 2 is also maintained. One technique to determine all guest virtual addresses that were created using a specific GPA is to query the GPA to SPA (FIG. 2) map for all SPAs that map to a specific GPA and then remove all entries from the GVA to SPA (FIG. 3 shadow page table) map that map to SPAs. Unfortunately, this method can be very slow as each of the steps involves a linear search of the GPA to SPA and GVA to SPA maps respectively. As an alternative, an inverse mapping of GPA to GVA could be maintained to explicitly handle this condition. Unfortunately, the latter approach consumes large amounts of extra memory.

An added complexity occurs because physical devices in computer systems address system memory using physical addresses and not virtual addresses. Thus, purging the virtual-to-physical mappings from the shadow page table (SPT) and translation look-aside buffer (TLB) will not prevent a physical device from physically accessing the system memory if the device is set up to perform a direct memory access (DMA) operation. DMA operations may be performed in virtual machine environments where DMA controller hardware and software are present.

When removing guest physical address space, it is important to be certain that the space is not currently involved in a DMA operation. One technique to prevent removal of a guest address space page, generally 4 K bytes or more, while an outstanding DMA transaction is ongoing is to maintain a single flag per page specifying whether the page is being used for a DMA operation. Unfortunately, different physical devices may be mapped to the same physical address space and thus the same address space may be involved in two different, possibly pending, DMA operations. Thus a single flag is not enough information to know when both DMA transactions have completed. A more advanced mechanism is desirable.

One possible solution to the multiple pending DMA operation is to provide a mechanism to prevent DMA requests to specific regions of system physical memory. Generally, a table is provided that allows the operating system to control whether a specific page may be read from or written to via a non-CPU agent, such as occurs during a DMA transaction. The table has one or more flags per page of physical memory specifying whether the page may be read from or written to via a DMA operation. This table is termed a DMA exclusion vector (DEV). It is desirable to use the DMA exclusion vector mechanism and still avoid the problem of multiple DMA transactions targeted against a physical address space that should be purged or modified from GPA tables.

Thus, there is a need for a method and system to permit the purging or modification of physical address space from reference tables used in guest to host physical address while still allowing some accesses to physical addresses, such a DMA and other I/O operations between virtual machines. The present invention addresses the aforementioned needs and solves them with additional advantages as expressed herein.

SUMMARY OF THE INVENTION

An aspect of the invention includes a method and system to allow accesses between virtual machines where one virtual machine requests an access to another virtual machines' allocated resources. One embodiment of the invention includes receiving a request to make an access, such as a DMA access, between two virtual machines using a temporary range in a first virtual machine guest physical address. The accessed pages are mapped into the temporary address space and a reference counter is used to keep track of the number of pending accesses. After the access is completed, the reference counter is decremented. The mapping may be discarded if the reference count is zero indicating that no additional accesses to the pages of interest are pending. In one embodiment, the invention finds utility as a method for use in a virtual machine environment when it is desirable to update guest physical address locations and it is necessary to modify or purge addresses corresponding to the desired pages which are still subject to access requests. References to the pages to be modified may be found in the temporary guest physical address locations, a translation look-aside buffer or a shadow page table.

BRIEF DESCRIPTION OF THE DRAWINGS

The foregoing summary, as well as the following detailed description of exemplary embodiments, is better understood when read in conjunction with the appended drawings. For the purpose of illustrating embodiments of the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary Embodiments of the Invention

In one aspect of the invention, a transient or temporary region of GPA space is created to determine which sections of the GPA space require additional data structures mapping guest physical addresses to guest virtual addresses to allow for fast removal or modification of guest physical address space. This feature is useful for fast insertion and removal of GPA space necessary for support of I/O transactions between partitions or virtual machines in a virtual machine environment. As one example, support of inter-virtual machine DMA transactions may be facilitated with the use of temporary GPA space. In one embodiment, a transient or temporary region of GPA space is defined by either the guest or the virtualization software as space within the GPA space, but which lies outside of the space allocated for normal application operations with the guest machine operating system. This location outside of normal guest operating system use avoids the problem of the guest operating system or the guest applications from accidentally utilizing the transient or temporary space in normal guest virtual machine operations.

The introduction of the transient or temporary region of guest physical address is based upon the observation that during GPA modification or purge, some address regions must be quickly removed while other address regions rarely or never change during the lifetime of a virtual machine. Thus, if a separate and temporary SPA to GVA inverse mapping table were implemented, it would not be heavily used and the expenditure in memory resource could be unjustified. As a result, according to an aspect of the invention, a SPA-to-GVA mapping to identify specific GVAs that should be altered is maintained only upon transient regions. When non-transient regions are modified in the GPA to SPA map, then slower purges of the GVAs from the GVA to SPA mappings are performed.

Figure 4:
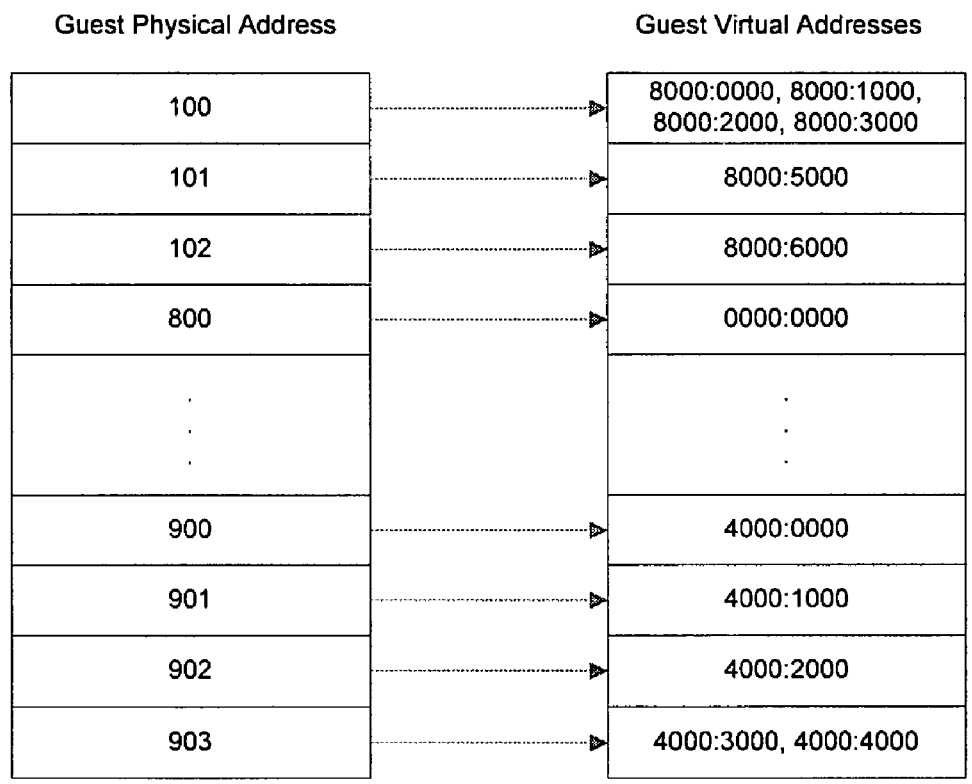
FIG. 4 is a guest virtual address to guest physical address mapping for a virtual machine.

In one aspect of the invention, for portions of the guest physical address space marked as transient, an additional GPA-to-GVA mapping is maintained which allows a swift identification of a GVA from a GPA. FIG. 4 depicts an example of a GPA to GVA mapping. Note that there are potentially multiple GVAs that can map to a single GPA. For example, in FIG. 4, GPA 100 can map to GVA 8000:000, 8000:1000, 8000:2000 and 8000:3000.

In another aspect of the invention, identified pages may be "locked" for an I/O transaction, such as a DMA operation. When it becomes desirable to purge a guest physical address range and remove corresponding references to those addresses, the modification preferably is not performed if the page is involved in a current or pending I/O or other DMA transaction. According to an aspect of the invention, maintenance of a "locked" state corresponding to a guest physical address allows an I/O access or other operation, such as a DMA, to continue when a purge or modification of GPA space is pending.

As discussed above, a single page may be involved in multiple pending operations, such as I/O or DMA transactions. It is preferable to prohibit modification of the GPA to SPA mapping while there are outstanding DMA requests for a portion of the region being modified. In one aspect of the invention, a reference counter is used to tally the number of I/O or other transactions, such as DMA, that are pending against a given page. In one implementation, a reference count of the outstanding transactions is used to allow or disallow modifications to a guest physical address space that involves pages with outstanding I/O or other transactions, such as DMA operations. The use of reference counts solves the twin problems of avoiding modification of a guest physical address space while outstanding transactions are ongoing and maintaining a single flag in the DMA exclusion vector while there may multiple outstanding DMA requests for a single page.

With regards to the reference count, the GPA-to-SPA map is preferably not modified while the reference count is non-zero. Furthermore, when a request is received to modify the GPA-to-SPA map, and if the reference count is non-zero, a new DMA request may be postponed to be handled until the request to modify the guest physical address space has been handled.

An I/O transaction may remain blocked to avoid a situation where a specific page is locked in memory and a request to modify or purge a guest physical address space is held for an arbitrarily long period of time. When a guest physical address is in the closed state, new requests to lock the pages within that region for a transaction, such as a DMA request, will either fail or wait until after the modification to the guest physical address space has occurred. This state prevents arbitrarily long waits from preventing a GPA space from being modified. The approach taken above to protect modification of the GPA to SPA map is also used to protect the DMA exclusion vector. Specifically, a reference count is maintained for the number of outstanding DMA transactions there are for a specific page, and when the count reaches zero, the addresses may be modified. Accordingly, when the reference count reaches zero and no additional I/O accesses to the page are immediately pending, the page is marked as being not accessible via DMA.

In another aspect of the invention, a balanced binary tree is used for fast query and modification of a guest physical address space. Entries in the guest physical address space map may be inserted, removed and queried based upon requests from guest applications. To achieve fast insertions, removals and queries of the guest physical address space data structures, a balanced binary tree data structure is preferred. The balanced binary tree provides us with $O(\log_2 n)$ worst case performance on all operations on the guest physical address space.

Figure 1:
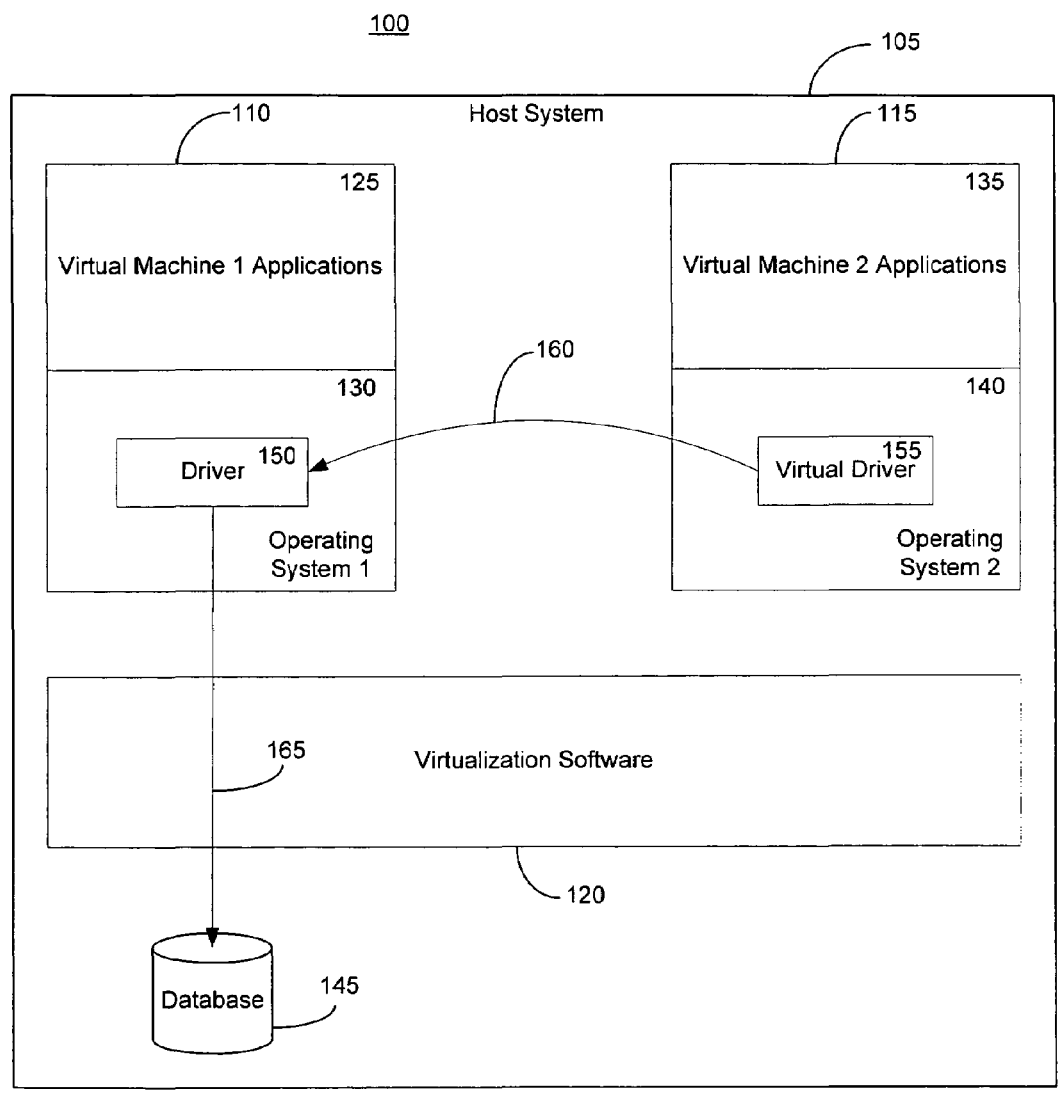
FIG. 1 is an exemplary virtual machine environment in which aspects of the invention may be realized.
Figure 2:
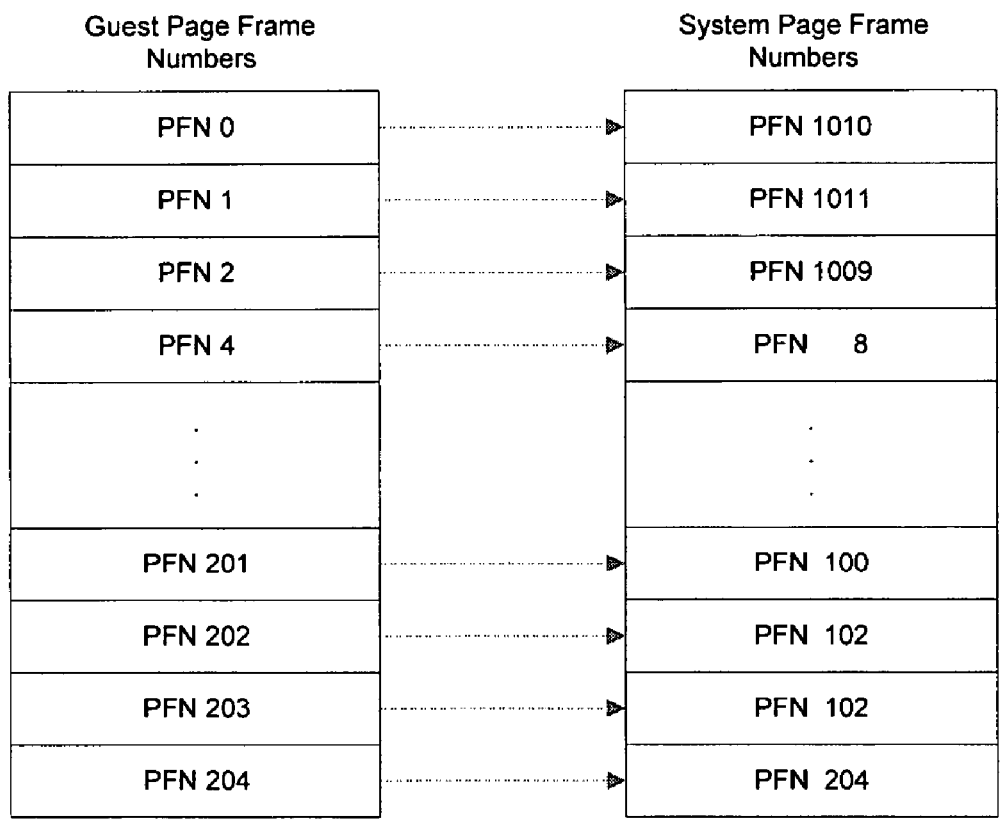
FIG. 2 is a guest physical address to system physical address mapping for a virtual machine.
Figure 3:
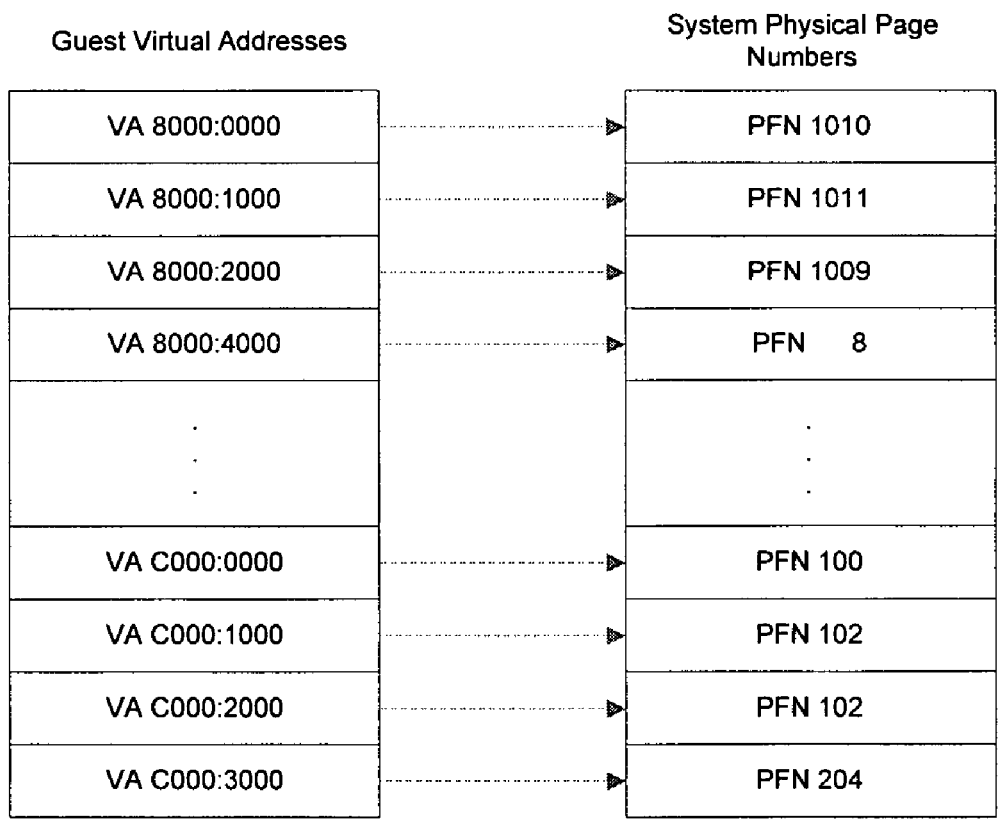
FIG. 3 is guest virtual address to system physical address mapping for a virtual machine.
Figure 5:
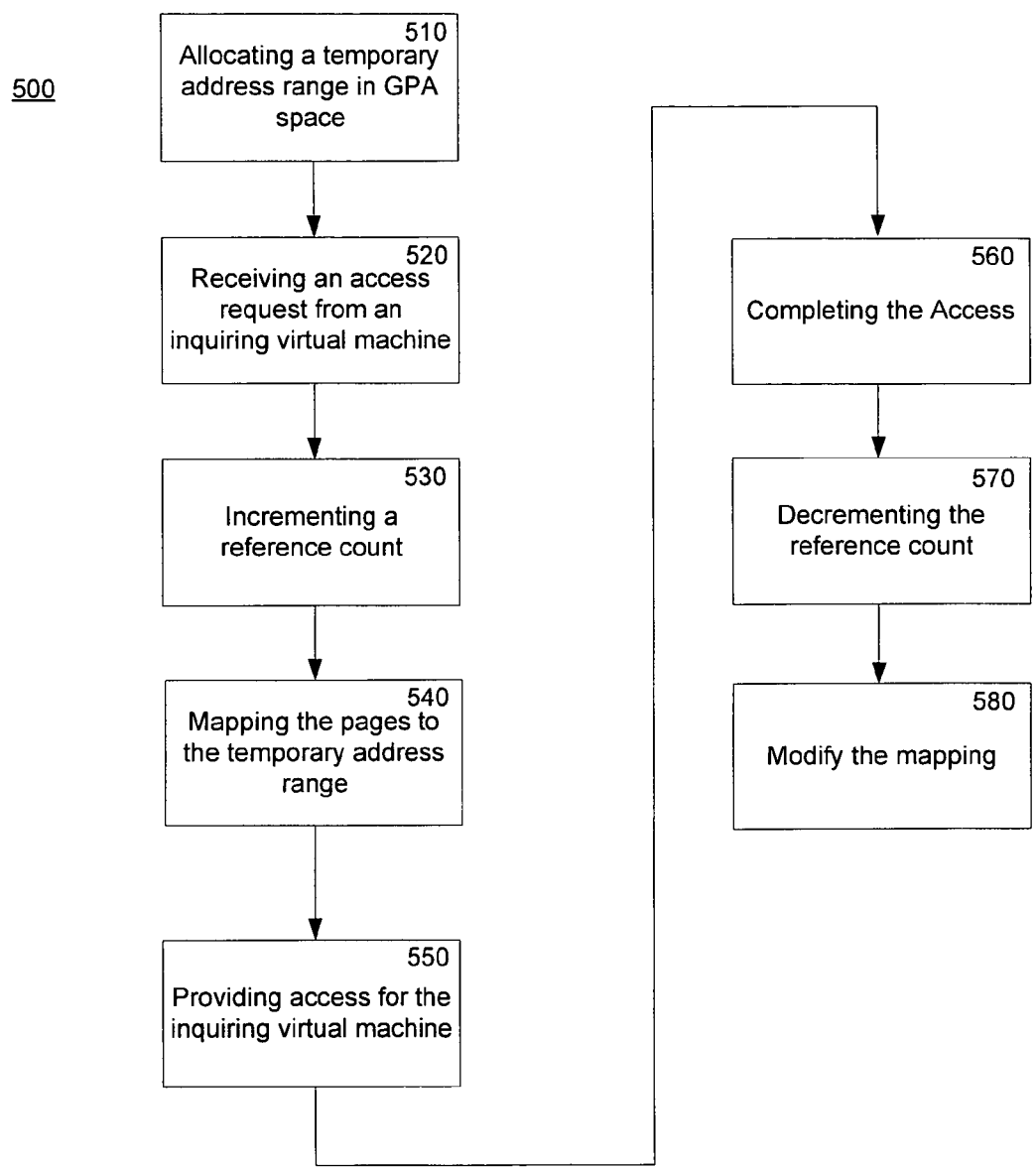
FIG. 5 is a flow diagram of a method incorporating aspects of the invention.

FIG. 5 depicts an exemplary method 500 in accordance with aspects of the invention. It is assumed that the computer environment in which the method is performed is a virtual machine environment similar to that of FIG. 1, where a host computer provides resources for two or more virtual machines. In an environment where a virtual machine makes requests for host resources, a guest virtual address is translated to a guest physical address and then translated to a system physical address. Once performed, the address translations are used in both a shadow page table and a translation look-aside buffer to speed up virtual machine operations. However, when changes to guest physical address space are needed, the shadow page table and a translation look-aside buffer need updating to prevent unnecessary accesses to unmapped addresses and to remap to more appropriate areas in address space. The exemplary method 500 of FIG. 5 operates in this environment and may be used as part of the address change and update mechanism while allowing for accesses from one partition or virtual machine to another partition or virtual machine.

The method 500 begins may be setup when an allocation of temporary guest physical address space within a first virtual machine is identified for sharing pages between virtual machines (step 510). This temporary or transient space is preferably located within a guest physical address range but outside of the operational reach of applications that use the guest physical address range in that virtual machine. Such a transient region may initially be allocated by the virtualization software in a virtual machine. Alternately, the transient or temporary region may be allocated by the guest operating system. It is noted that the allocation of a temporary region in guest physical address space may be accomplished at any time before a virtual machine to virtual machine transaction and need not be accomplished every time a transaction is desired.

A request is received (step 520) from a second virtual machine to a first virtual machine to perform an operation, such as an input/output access of memory or a direct memory access. The access is routed through virtualization software on the host computer in the virtual machine environment. In response to the request, a reference counter, associated with an address page in the request, is incremented (step 530). This has the effect of locking the pages of interest and preparation can be made to share the designated pages. If the transaction requested is a DMA operation and if the reference counter is incremented from zero to one, then a DMA exclusion vector is checked to see verify that DMA operations are permitted. The pages of interest are also checked to insure they exist and are valid GPA to SPA mappings.

The pages of interest are then mapped into the first virtual machine's guest physical address space within the previously defined temporary address range (step 540). After the pages are mapped into the first virtual machine's guest physical address, the intended transaction may be started (step 550). If the access is a DMA request, starting the transaction involves sending commands, such as read and write commands, parameters, such as a transaction for a specific type of data such as video color, and specific source and destination addresses from the second virtual machine to the first virtual machine to establish and conduct the DMA transfer.

After data is exchanged between the second virtual machine and the first virtual machine, the transaction completes (step 560). If the transaction is a DMA operation, the first virtual machine signals the second virtual machine that the data has been transferred. Upon completion, the second virtual machine sends an indication to the virtualization software to unlock and unshare the pages involved in the transaction. The reference counter incremented in step 530 is decremented (step 570). If the transaction is a DMA operation, and the reference count goes from a one to a zero, then the DMA exclusion vector may be set to disallow further DMA transactions. In an aspect of the invention, this action allows the system to modify or purge guest physical address ranges involving the pages of interest after completing the DMA transaction.

After the reference counter is decremented, if there are still pending transactions, then those transactions may be executed. Once executed and the reference counter goes to zero, then the system is free to modify the pages or mappings of interest as required. Mappings may be modified as needed (step 580) after the reference counter is decremented to zero. This remapping opportunity allows the system to update the shadow page tables and the transaction look-aside buffer to be modified to either change or purge mappings related to addresses that should be changed to accommodate changes in the guest physical address space.

Exemplary Computing Device

Figure 6:
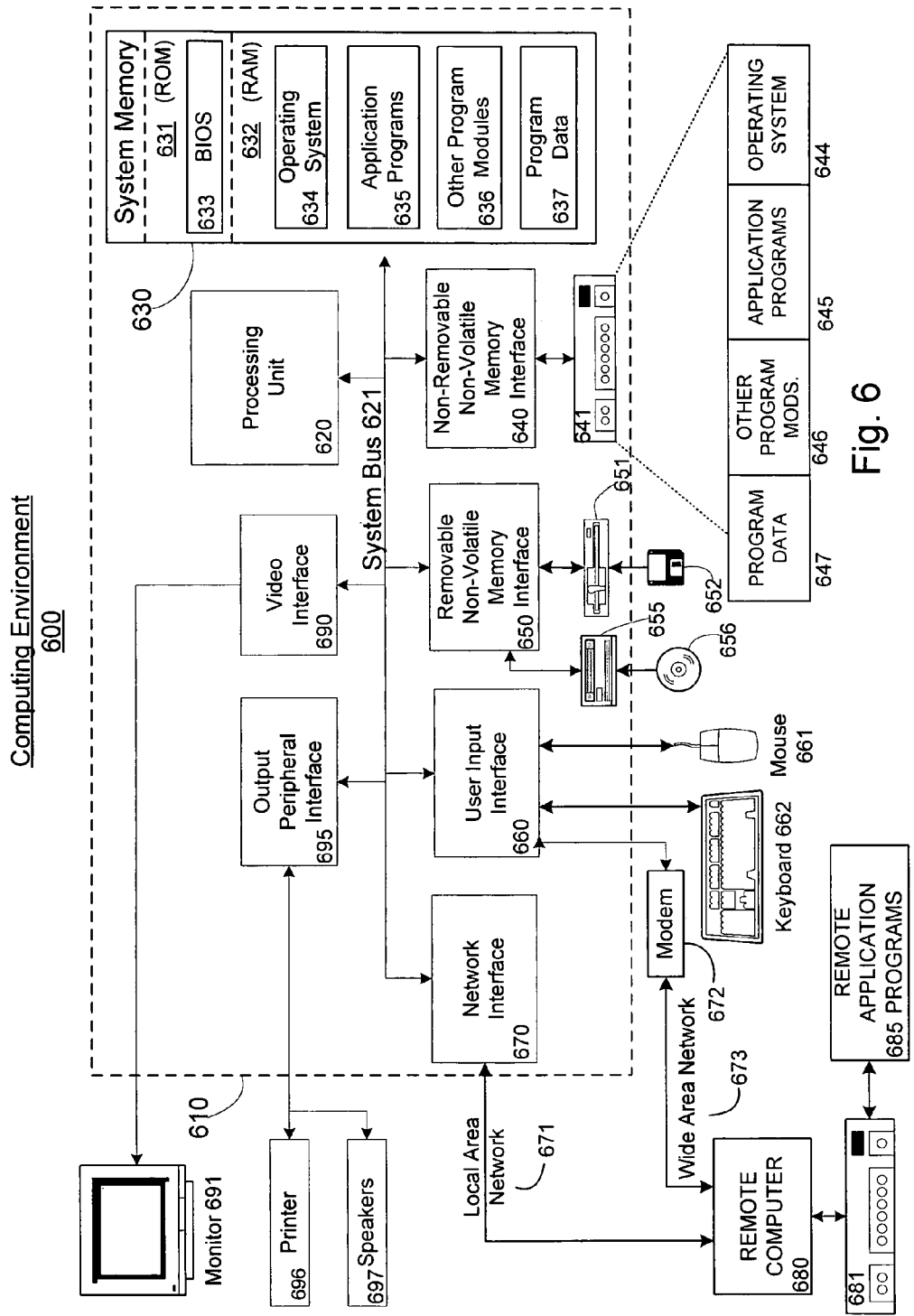
FIG. 6 is a block diagram showing an exemplary computing environment in which aspects of the invention may be implemented.

FIG. 6 and the following discussion are intended to provide a brief general description of a suitable computing environment in which embodiments of the invention may be implemented. While a general purpose computer is described below, this is but one single processor example, and embodiments of the invention with multiple processors may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 6 thus illustrates an example of a suitable computing system environment 600 in which the embodiments of the invention may be implemented, although as made clear above, the computing system environment 600 is only one example of a suitable computing environment and is not intended to suggest any limitation as to the scope of use or functionality of an embodiment of the invention. Neither should the computing environment 600 be interpreted as having any dependency or requirement relating to any one or combination of components illustrated in the exemplary operating environment 600.

With reference to FIG. 6, an exemplary system for implementing an embodiment of the invention includes a general purpose computing device in the form of a computer system 610. Components of computer system 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 610 typically includes a variety of computer readable media. Computer readable media can be any available media that can be accessed by computer system 610 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer system 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer system 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6 provide storage of computer readable instructions, data structures, program modules and other data for the computer system 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer system 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus 621, but may be connected by other interface and bus structures, such as a parallel port, game port or a universal serial bus (USB). A monitor 691 or other type of display device is also connected to the system bus 621 via an interface, such as a video interface 690, which may in turn communicate with video memory (not shown). In addition to monitor 691, computer systems may also include other peripheral output devices such as speakers 697 and printer 696, which may be connected through an output peripheral interface 695.

The computer system 610 may operate in a networked or distributed environment using logical connections to one or more remote computers, such as a remote computer 680. The remote computer 680 may be a personal computer, a server, a router, a network PC, a peer device or other common network node, and typically includes many or all of the elements described above relative to the computer system 610, although only a memory storage device 681 has been illustrated in FIG. 6. The logical connections depicted in FIG. 6 include a local area network (LAN) 671 and a wide area network (WAN) 673, but may also include other networks/buses. Such networking environments are commonplace in homes, offices, enterprise-wide computer networks, intranets and the Internet.

When used in a LAN networking environment, the computer system 610 is connected to the LAN 671 through a network interface or adapter 670. When used in a WAN networking environment, the computer system 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer system 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a software program profiler for an embedded system. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of an embodiment of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed is:

1. A method of sharing pages between virtual machines, the virtual machines operating using resources from a host computer, the method comprising:
    allocating a temporary guest physical address range of a first virtual machine for sharing pages between virtual machines;
    receiving a request from a second virtual machine to access pages available to the first virtual machine, the request received by virtualization software on the host computer;
    incrementing a reference counter of pending accesses to indicate a pending DMA transfer and verifying that a guest physical address to a host physical address mapping for the pages is valid and a DMA (direct memory access) exclusion vector allows access to the pages;
    mapping the pages into a portion of the temporary guest physical address range of the first virtual machine;
    allowing the pages available to the first virtual machine to be accessed by the second virtual machine by setting up a DMA controller to transfer information between the second virtual machine and a range of host physical addresses;
    completing access of the pages by the second virtual machine and notifying the virtualization software of access completion;
    decrementing the reference counter of pending accesses to the pages by setting a DMA exclusion vector to exclude the DMA controller from operating on the pages if the reference counter is decremented to zero; and
    removing the mapping of the pages from the temporary guest physical address range if the reference counter is zero.

2. The method of claim 1, wherein receiving a request from a second virtual machine to access pages available to the first virtual machine comprises receiving a direct memory address (DMA) request from a second virtual machine to access pages mapped to a first virtual machine.

3. The method of claim 1, wherein completing access of the pages by the second virtual machine and notifying the virtualization software of access completion comprises receiving an indication from host hardware that DMA operations are complete and sending a completion message from the first virtual machine to the second virtual machine, wherein the second virtual machine notifies the virtualization software of completion.

4. The method of claim 1, wherein removing the mapping of the pages from the temporary guest physical address range further comprises un-mapping entries of the pages from one or more of a shadow page table and a translation look-aside table.

5. A computer system for sharing pages between virtual machines, the system comprising:
    a host computer, the host computer having hardware resources available to a plurality of virtual machines;
    virtualization software, the virtualization software comprising an interface between the host computer and any of the plurality of virtual machines;
    a first virtual machine and a second virtual machine, the first virtual machine having access to at least one page resource;
    a temporary guest physical address range of the first virtual machine for sharing pages between virtual machines;
    a host processor having access to the host computer memory, the memory having instructions which when executed, perform a method comprising:
        receiving a request from the second virtual machine to access the pages available to the first virtual machine, the request received by the virtualization software;

incrementing a reference counter of pending accesses to indicate a pending DMA (direct memory access) transfer and verifying that a guest physical address to a host physical address mapping for the pages is valid and a DMA exclusion vector allows access to the pages;

mapping the pages into a portion of the temporary guest physical address range;

allowing the pages available to the first virtual machine to be accessed by the second virtual machine by setting up a DMA controller to transfer information between the second virtual machine and a range of host physical addresses;

notifying the virtualization software of access completion;

decrementing the reference counter of pending accesses to the pages by setting a DMA exclusion vector to exclude the DMA controller from operating on the pages if the reference counter is decremented to zero; and removing the mapping of the pages from the temporary guest physical address range if the reference counter is zero.

6. The system of claim 5, further comprising at least one of a translation look aside buffer and a shadow page table, the at least one of the translation look aside buffer and the shadow page table being updated as a result of the method step of removing the mapping of the pages.

7. The system of claim 6, wherein the method step of removing the mapping of the pages from the temporary guest physical address range further comprises un-mapping entries of the pages from one or more of the shadow page table and the translation look-aside buffer.

8. The system of claim 5, wherein the method step of completing access of the pages by the second virtual machine and notifying the virtualization software of access completion comprises receiving an indication from the DMA controller that the information transfer is complete and sending a completion message from the first virtual machine to the second virtual machine, wherein the second virtual machine notifies the virtualization software of completion.

9. A computer-readable storage medium having computer-executable instructions for performing a method of sharing pages between virtual machines, the virtual machines operating using resources from a host computer, the method comprising:

allocating a temporary guest physical address range of a first virtual machine for sharing pages between virtual machines;

receiving a request from a second virtual machine to access pages available to the first virtual machine, the request received by virtualization software on the host computer;

incrementing a reference counter of pending accesses; to indicate a pending DMA (direct memory access) transfer and verifying that a guest physical address to a host physical address mapping for the pages is valid and a DMA exclusion vector allows access to the pages, wherein the reference count acts to lock out other accesses to the pages;

mapping the pages into a portion of the temporary guest physical address range of the first virtual machine;

allowing the pages available to the first virtual machine to be accessed by the second virtual machine by setting up a DMA controller to transfer information between the second virtual machine and a range of host physical addresses;

completing access of the pages by the second virtual machine and notifying the virtualization software of access completion;

decrementing the reference counter of pending accesses to the pages by setting a DMA exclusion vector to exclude the DMA controller from operating on the pages if the reference counter is decremented to zero; and removing the mapping of the pages from the temporary guest physical address range if the reference counter is zero.

10. The computer-readable storage medium of claim 9, wherein the step of receiving a request from a second virtual machine to access pages available to the first virtual machine comprises receiving a direct memory address (DMA) request from the second virtual machine to access the pages mapped to the first virtual machine.

11. The computer-readable storage medium of claim 9, wherein the step of completing access of the pages by the second virtual machine and notifying the virtualization software of access completion comprises receiving an indication from host hardware that DMA operations are complete and sending a completion message from the first virtual machine to the second virtual machine, wherein the second virtual machine notifies the virtualization software of completion.

* * * * *

UNITED STATES PATENT AND TRADEMARK OFFICE
CERTIFICATE OF CORRECTION

| | | |
|---|---|---|
| PATENT NO. | : 7,334,076 B2 | Page 1 of 1 |
| APPLICATION NO. | : 11/075219 | |
| DATED | : February 19, 2008 | |
| INVENTOR(S) | : Matthew D. Hendel et al. | |

It is certified that error appears in the above-identified patent and that said Letters Patent is hereby corrected as shown below:

In column 14, line 5, in Claim 9, delete "accesses;" and insert -- accesses --, therefor.

Signed and Sealed this
Fifteenth Day of February, 2011

David J. Kappos
*Director of the United States Patent and Trademark Office*